(12) United States Patent
Naito

(10) Patent No.: US 6,553,058 B1
(45) Date of Patent: Apr. 22, 2003

(54) MULTI-USER PARALLEL INTERFACE CANCELER APPARATUS

(75) Inventor: Kosuke Naito, Tokyo (JP)

(73) Assignee: NEC Corporation, Tokyo (JP)

( * ) Notice: Subject to any disclaimer, the term of this patent is extended or adjusted under 35 U.S.C. 154(b) by 125 days.

(21) Appl. No.: 09/708,418

(22) Filed: Nov. 9, 2000

(30) Foreign Application Priority Data

Sep. 11, 1999 (JP) ............................................. 11-318483

(51) Int. Cl.$^7$ ................................................. H04B 1/69
(52) U.S. Cl. ..................................... 375/148; 375/130
(58) Field of Search ................................. 375/148, 144, 375/140, 346, 349, 130; 370/342, 320, 335, 479; 714/794, 795

(56) References Cited

U.S. PATENT DOCUMENTS

| 6,032,026 A | * | 2/2000 | Seki et al. | ................ | 144/134.1 |
| 6,192,067 B1 | * | 2/2001 | Toda et al. | ................ | 375/140 |
| 6,222,498 B1 | * | 4/2001 | Ishii et al. | ................ | 343/853 |
| 6,272,167 B1 | * | 8/2001 | Ono | ............................ | 370/335 |
| 6,282,233 B1 | * | 8/2001 | Yoshida | ...................... | 375/148 |
| 6,385,181 B1 | * | 5/2002 | Tsutsui et al. | .............. | 370/335 |

FOREIGN PATENT DOCUMENTS

| JP | 2746261 | 2/1998 |
| JP | 11-168408 | 6/1999 |

* cited by examiner

Primary Examiner—Chi Pham
Assistant Examiner—Khai Tran
(74) Attorney, Agent, or Firm—McGinn & Gibb, PLLC

(57) ABSTRACT

A multi-user parallel interference canceler apparatus for repeatedly performing a hard decision over a plurality of stages to improve channel estimation precision, includes a plurality of interference estimation units, a plurality of decision error estimation units, a plurality of combiners, and a plurality of receivers. The interference estimation units are arranged in units of stages and the number of estimation units in each stage corresponds to the number of users. The decision error estimation units are arranged in units of stages. The combiners are arranged in units of stages. The receivers are arranged in a last stage in units of users.

12 Claims, 4 Drawing Sheets

MULTI-USER PARALLEL INTERFACE CANCELER APPARATUS

BACKGROUND OF THE INVENTION

1. Field of the Invention

The present invention relates to an interference canceler apparatus used in a mobile communication system and, more particularly, to a multi-user parallel interference canceler apparatus used in a cellular mobile communication system using DS-CDMA (Direct Sequence Code Division Multiple Access).

2. Description Prior Art

In a conventional mobile communication system, an interference canceler is used as a technique of improving the transmission quality and increasing the cell capacity. As an interference canceler, a multi-user parallel interference canceler is available, in which temporary decisions about symbols are simultaneously made for all the users to generate replicas, and each replica is subtracted from an original signal.

A characteristic feature of the above multi-user parallel interference canceler described above is that many users can be handled as compared with a multi-user serial interference canceler in which there is a limit to the number of users who can be handled because replicas are sequentially subtracted from an original signal in descending order of levels. On the other hand, in this canceler, a hard decision error in each stage will greatly influence demodulation at another user in the next stage.

SUMMARY OF THE INVENTION

The present invention has been made in consideration of the above problem in the prior art, and has as its object to provide a multi-user parallel interference canceler apparatus which can reduce the influences of hard decision errors and improve interference removing characteristics.

In order to achieve the above object, according to the main aspect, there is provided a multi-user parallel interference canceler apparatus for repeatedly performing a hard decision over a plurality of stages to improve channel estimation precision, comprising a plurality of interference estimation units arranged in units of stages to be equal in number to users, a plurality of decision error estimation units arranged in units of stages, a plurality of combiners arranged in units of stages, and a plurality of receivers arranged in a last stage in units of users.

In the multi-user parallel interference canceler apparatus according to the main aspect described above, each of the interference estimation units comprises a plurality of despreading processing units each for receiving a received signal or a residual signal in a preceding stage and a symbol replica signal, calculating a reception symbol signal and an estimated value of a transmission path characteristic from the received signal or residual signal and the symbol replica signal, and outputting the reception symbol signal, the estimated value of the transmission path characteristic, and the symbol replica signal from the preceding stage, a first combiner (a RAKE combiner) for combining phase-corrected reception symbol signals corresponding to the respective fingers in the plurality of despreading processing units at a maximum ratio, a decision unit for making a hard decision about the reception symbol signal combined by the RAKE combiner, a plurality of replica generation units for respectively receiving the estimated values of the transmission path characteristics output from the plurality of despreading processing units, the symbol replica signals from the preceding stage, and the hard decision results obtained by the decision units, calculating symbol replica signals and chip replica signals in a current stage from the estimated values of the transmission path characteristics, the symbol replica signals from the preceding stage, and the hard decision results obtained in the decision units, and outputting the symbol replica signals and the chip replica signals, a second combiner for combining the chip replica signals output from the plurality of replica generation units, a first switch for outputting "0" as the chip replica signal, if the hard decision in the current stage differs from that in the preceding stage and the hard decision in the current stage is wrong, in accordance with a control signal output as a decision result from the decision error estimation units for checking, on the basis of a signal obtained by despreading the received signal or residual signal from the preceding stage which is input to the despreading processing unit, the symbol replica signal input from the preceding stage to the despreading processing unit, and the hard decision result in the decision unit, whether the hard decision in the current stage coincides with that in the preceding stage and the hard decision in the current stage is wrong, and otherwise outputting the chip replica signal generated by the replica generation unit, and a second switch for outputting the symbol replica signal in the preceding stage in accordance with the control signal if the hard decision in the current stage differs from that in the preceding stage and the hard decision in the current stage is wrong, and otherwise outputting the symbol replica signal generated by the replica generation unit.

In addition, the despreading processing unit comprises a despreading unit for despreading the received signal or the residual signal from the preceding stage, an adder for adding the signal despread by the despreading unit and the symbol replica signal from the preceding stage and outputting a resultant signal as a reception symbol signal, and a channel estimation circuit for calculating an estimated value of a transmission path characteristic on the basis of the signal output from the adder, and a first multiplier for multiplying the signal output from the adder by the estimated value of the transmission path characteristic calculated by the channel estimation circuit and outputting a resultant signal as the phase-corrected reception symbol signal.

The replica generation unit comprises a second multiplier for multiplying the hard decision result in the decision unit by the estimated value of the transmission path characteristic output from the despreading processing unit and outputting a resultant signal as a symbol replica signal in the current stage, a subtracter for subtracting the symbol replica signal in the preceding stage from the symbol replica signal output from the second multiplier, and a re-despreading unit for spreading the signal output from the subtracter and outputting a resultant signal as a chip replica signal in the current stage.

The decision error estimation unit calculates a phase difference vector of the reception symbol signal, and decides that the hard decision in the current stage is wrong when an absolute value of an average of the phase difference vectors is smaller than a predetermined threshold. In addition, if all decision results in the plurality of interference estimation units indicate that hard decisions are wrong, the decision error estimation unit assumes that there is no error in the hard decision in an interference estimation unit exhibiting a largest absolute value of the average of the phase difference vectors.

The decision unit is set such that the threshold decreases toward the subsequent stages.

Each of the plurality of receivers comprises only the despreading processing unit and the RAKE combiner.

In the present invention having the above arrangement, if the hard decision result in the current stage differs from that in the preceding stage and the hard decision in the current stage is wrong, "0" is output as a chip replica signal. Otherwise, the chip replica signal in the current stage is output. In addition, if the hard decision result in the current stage differs from that in the preceding stage and the hard decision in the current stage is wrong, the symbol replica signal in the preceding stage is output as a reception symbol signal. Otherwise, the reception symbol signal in the current stage is output.

As described above, with respect to a user for which a hard decision error has occurred, the processing in the corresponding stage is not performed, and the result is sent from the preceding stage to the next stage without any change. Therefore, the influences of hard decision errors can be reduced, and the interference removing ability can be improved.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIGS. 3A and 3B are schematic views for explaining residual signals in the embodiment shown in FIG. 1, in which FIG. 3A shows the state of residual signals in a case where a hard decision is correct, and FIG. 3B shows the state of residual signals in a case where a hard decision is wrong.

DETAILED DESCRIPTION OF THE PREFERRED EMBODIMENT

A preferred embodiment of the present invention will be described below with reference to the accompanying drawings.

Figure 1:
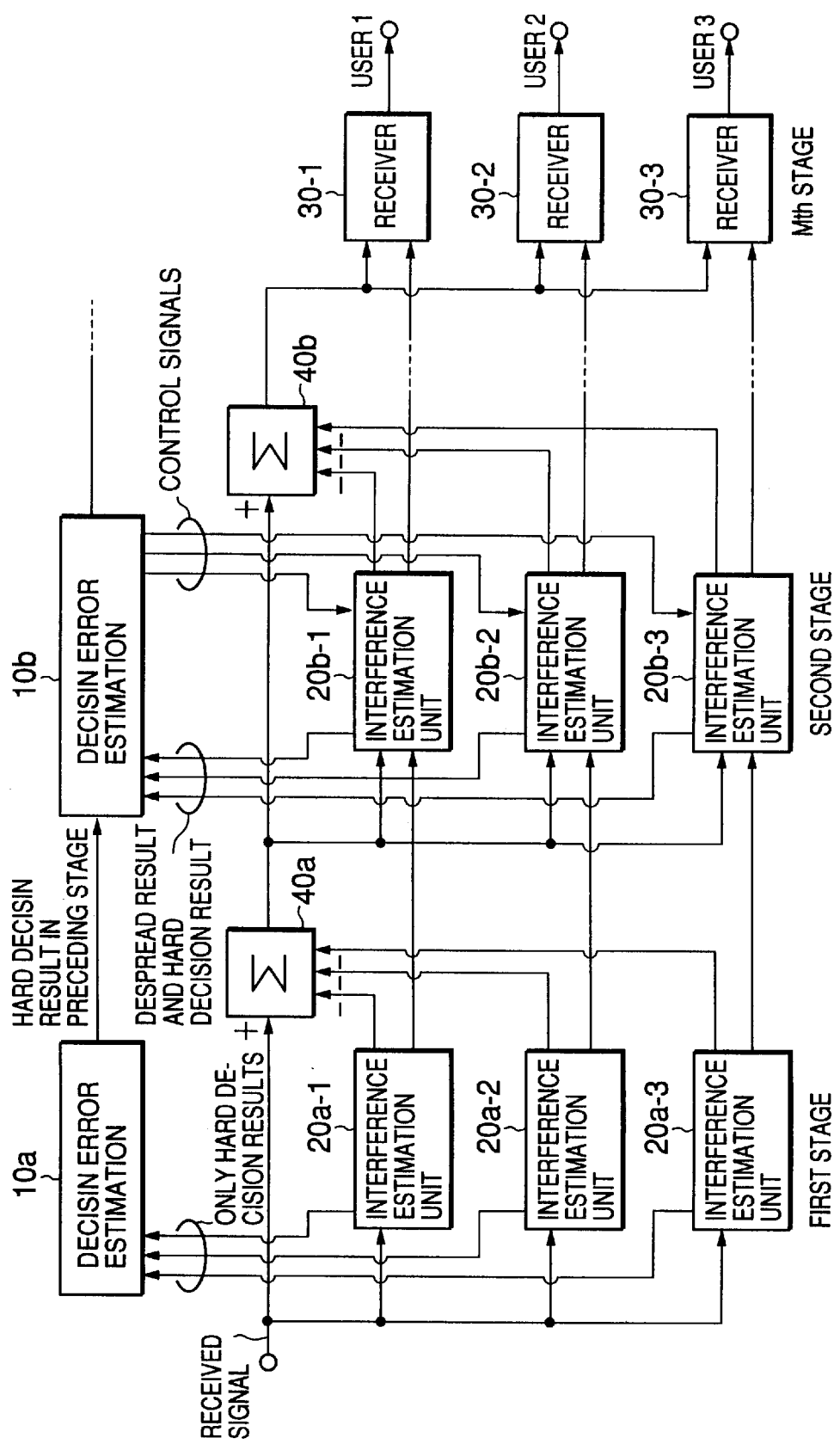
FIG. 1 is a block diagram showing the overall arrangement of a multi-user parallel interference canceler according to an embodiment of the present invention.

FIG. 1 is a view showing an interference canceler apparatus according to a preferred embodiment of the present invention, and more specifically, the arrangement of a multi-user parallel interference canceler apparatus (for three users).

As shown in FIG. 1, this embodiment is comprised of interference estimation units (IEUs) $20a$-1 to $20a$-3, $20b$-1 to $20b$-3, . . . arranged in units of sets of a plurality of stages in correspondence with the respective users, decision error estimation units (DEEUs) $10a$, $10b$, . . . arranged in units of stages to receive hard decision results from the interference estimation units $20a$-1 to $20a$-3, $20b$-1 to $20b$-3, . . . and control replica generation in the interference estimation units $20a$-1 to $20a$-3, $20b$-1 to $20b$-3, . . . on the basis of the hard decision results, and receivers 30-1 to 30-3 respectively arranged in the last stage in units of users.

The decision error estimation units $10a$, $10b$, . . . arranged in units of stages receive despread results on the respective fingers, symbol replica signals from the preceding stage, and hard decision results after RAKE combining, and also receive hard decision results on the respective users in the preceding stage from the decision error estimation units in the preceding stage.

The decision error estimation units $10a$, $10b$, . . . estimate, from the received information, a user for which an erroneous hard decision has been made, and send control signals to the replica generation units in the interference estimation units $20a$-1 to $20a$-3, $20b$-1 to $20b$-3, . . . , thereby stopping the processing in the stage corresponding to the user for which a decision error is estimated. In addition, the decision error estimation units $10a$, $10b$, . . . output "0"s as chip replicas and symbol replica signals from the preceding stage as reception symbol signals without any change. If a decision error is estimated, a hard decision result from the preceding stage is sent to the decision error estimation unit in the next stage. Only in the first stage, the decision error estimation unit $10a$ receives only hard decision results from the interference estimation units $20a$-1 to $20a$-3 and sends the hard decision results to the decision error estimation unit $10b$ in the next stage without sending any control signal.

Combiners $40a$ and $40b$ subtract the chip replicas generated by the interference estimation units $20a$-1 to $20a$-3, $20b$-1 to $20b$-3, . . . from the residual signals in the respective stages.

In the last stage, no processing is performed by the decision error estimation units, and the receivers 30-1 to 30-3 are used instead of the decision error estimation units. The outputs from these receivers are sent to demodulators (not shown) arranged for the respective users.

Figure 2:
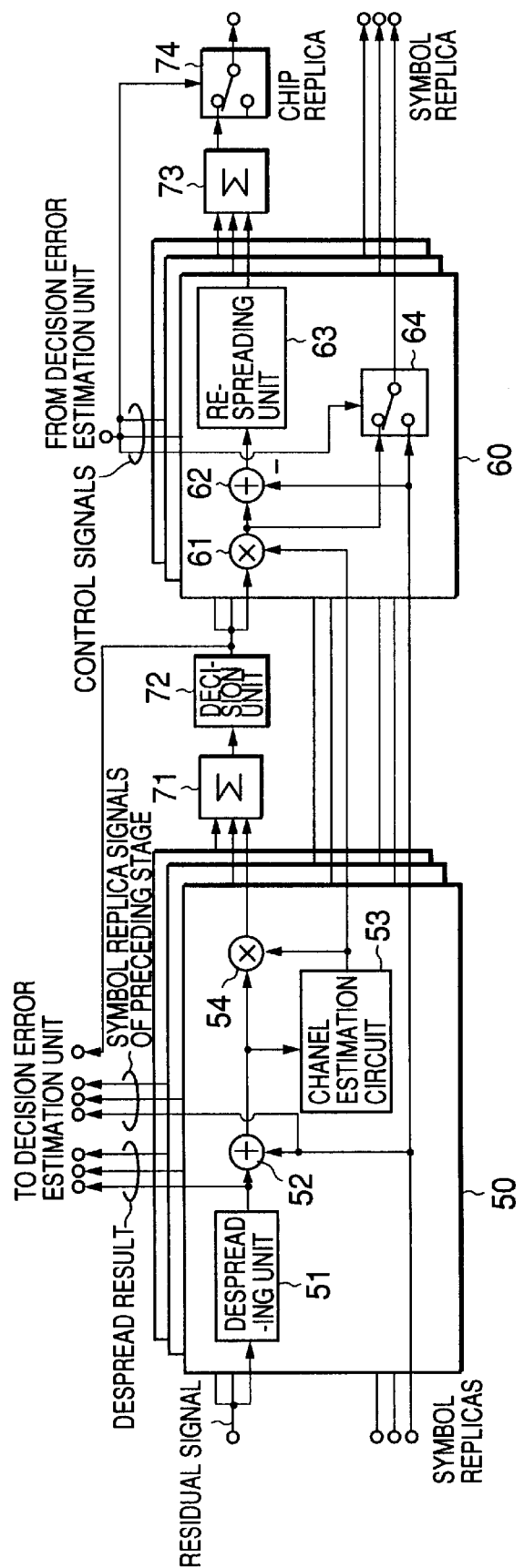
FIG. 2 block diagram showing an example of the arrangement of an interference estimation unit used in the embodiment shown in FIG. 1.

FIG. 2 is a view showing the arrangement of each of the interference estimation units $20a$-1 to $20a$-3, $20b$-1 to $20b$-3, . . . . Assume that the number of fingers is three.

Referring to FIG. 2, an input residual signal (a received signal at the first stage) is sent to a despreading processing unit 50 provided for each finger.

The signals sent to the despreading processing units 50 are despread by despreading units 51 with spreading codes delayed in accordance with the bus timing. The resultant signals are sent to the decision error estimation units $10a$, $10b$, . . . (not sent at the first stage), together with the symbol replica signals sent from the preceding stage.

The despread result obtained by each despreading unit 51 and the symbol replica signal sent from the preceding stage are added by an adder 52 to generate a reception symbol signal.

Of the reception symbol signals, the pilot symbol to be inserted in each slot is input to a channel estimation circuit 53, and the estimated value of a transmission path characteristic is obtained by the channel estimation circuit 53.

The phase rotation in the transmission path is corrected by making the first multiplier 54 multiply the complex conjugate of the estimated value obtained by the channel estimation circuit 53 by the reception symbol signal.

The phase-corrected reception symbol signals in the respective fingers are combined at a maximum ratio by a RAKE combiner 71 serving as the first combiner. Thereafter, a hard decision is made by a decision unit 72.

The hard decision result is sent to the decision error estimation units 10a, 10b, . . . and, at the same time, input to replica generation units 60 provided for the respective fingers.

In each replica generation unit 60, first of all, a second multiplier 61 multiplies the hard decision result obtained by the decision unit 72 by the transmission path estimated value estimated by the channel estimation circuit 53 to generate a symbol replica signal.

The generated symbol replica signal is input to a subtracter 62. The subtracter 62 then subtracts the symbol replica signal from the preceding stage from the symbol replica signal generated by the second multiplier 61. A re-spreading unit 63 then re-spreads the resultant signal with a spreading code delayed in accordance with the bus timing to generate a chip replica.

A second combiner 73 adds the chip replicas in all the fingers to generate a whole ship replica.

A second switch 64 in each replica generation unit 60 receives, at its upper terminal, the symbol replica signal generated by the second multiplier 61, and also receives, at its lower terminal, the symbol replica signal generated in the preceding stage and directly sent from the despreading processing unit 50.

The switch 64 is switched in accordance with a control signal from a corresponding one of the decision error estimation units 10a, 10b, . . . . If the control signal is "0", the upper terminal is connected, and the symbol replica signal generated in this stage is sent to the next stage. If the control signal is "1", the lower terminal is connected, and the symbol replica from the preceding stage is sent to the next stage.

A first switch 74 receives, at its upper terminal, the whole chip replica generated by the combiner 73, but receives nothing at its lower terminal. The switch 74 is switched in accordance with a control signal from the decision error estimation units 10a, 10b, . . . . If the control signal is "0", the upper terminal is connected, and the chip replica becomes an output signal. If the control signal is "1", the lower terminal is connected, and "0" becomes an output signal.

To reduce power consumption and calculation amount, when the control signal is "1", no processing is performed in the multiplier 61, subtracter 62, and re-spreading unit 63 in each replica generation unit 60.

Note that each of the receivers 30-1 to 30-3 includes only the despreading processing unit 50 and RAKE combiner 71 of the components of the interference estimation unit shown in FIG. 2.

The operation of the interference canceler apparatus having the above arrangement will be described below.

Figure 3A:
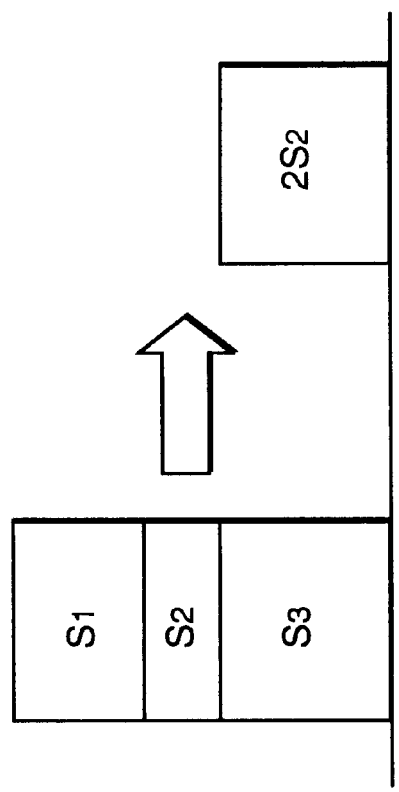
Figure 3A:
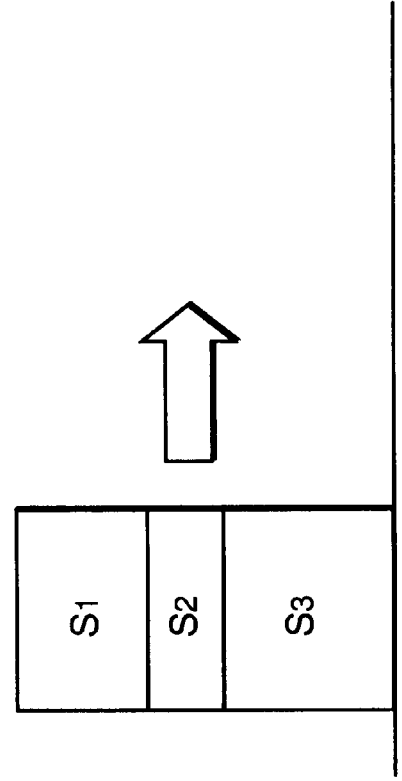

FIGS. 3A and 3B are views for explaining a residual signal in the parallel multi-user interference canceler shown in FIGS. 1 and 2. FIG. 3A shows the state of a residual signal in a case where a hard decision is correct. FIG. 3B shows the state of a residual signal in a case where a hard decision is wrong. Assume that signal powers $S_1$, $S_2$, and $S_3$ are respectively set for users 1, 2, and 3.

Assume that no consideration is given to any error in a transmission path estimated value for the sake of simplicity. In this case, if the hard decision at each user is correct, no signal power component is left in a residual signal when replicas are subtracted, as shown in FIG. 3A.

If the hard decision at user 2 is wrong, $2S_2$ is left when the chip replicas are subtracted, as shown in FIG. 3B.

Consider only user 2. The signal power increases relatively, and the portion corresponding to the decision error is eliminated in the next stage. For users 1 and 3, however, the interference powers increase, and hard decision errors may occur, resulting in a deterioration in the interference removing ability of the interference canceler.

In this embodiment, the decision error estimation units 10a, 10b, . . . are provided for the respective stages to decide, on the basis of the despread result obtained in each finger and the hard decision result obtained by each user, whether the hard decision result become a decision error when it changes from that in the preceding stage. If a decision error is determined, a control signal is used to give an instruction to stop the replica generation processing in the current stage and directly send the symbol replica signal from the preceding stage (this control signal is "1"). Assume that the decision has changed. Even in this case, if it is determined that a wrong decision changes to a correct decision, a control signal is used to given an instruction to perform normal processing (this control signal is "0").

The operation of each of the decision error estimation units 10a, 10b, . . . shown in FIG. 1 will be described below.

Figure 4:
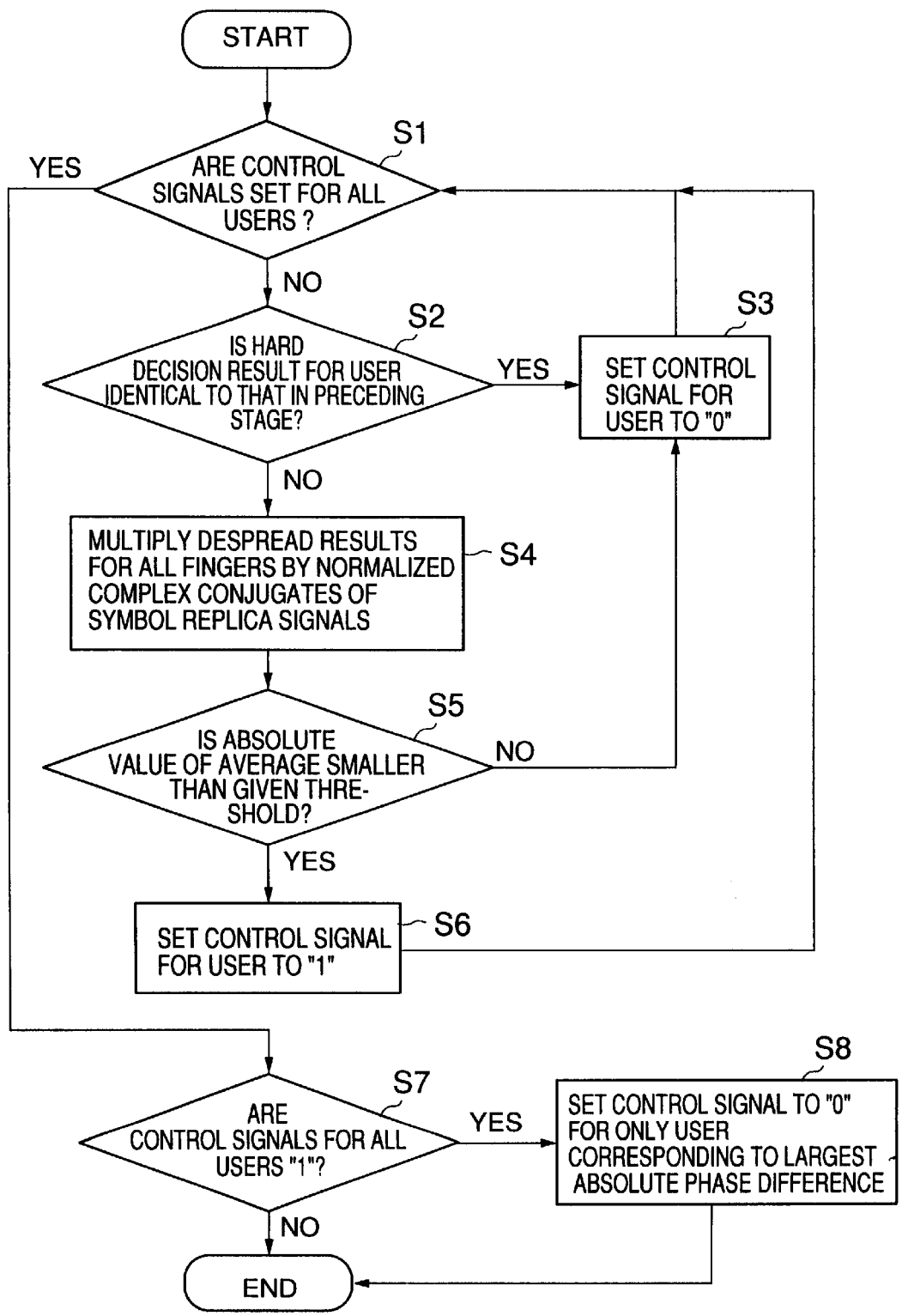
FIG. 4 is a flow chart for explaining the operation of a decision error estimation unit in FIG. 1.

FIG. 4 is a flow chart for explaining the operation of each of the decision error estimation units 10a, 10b, . . . . FIG. 4 shows processing to be performed for each symbol.

First of all, counting operation is performed to check whether control signals are set for all users (step S1). If there is a user for which no control signal is set, the hard decision result associated with the user is compared with that in the preceding stage (step S2).

If it is determined in step S2 that the hard decision result coincides with that in the preceding stage, the control signal for the corresponding user is set to "0" (step S3). The flow then returns to step S1.

If it is determined in step S2 that the hard decision result differs from that in the preceding stage, the despread results in all the fingers of the user are multiplied by the complex conjugate of the normalized symbol replica to obtain phase difference vectors (step S4).

If the decision in the preceding stage is correct and the decision in the current stage is wrong, since the despread results are composed of only interference components from the remaining users and noise components, the distribution of the despread results is statistically the same as that of random noise. In contrast to this, if the decision in the preceding stage is wrong, phase difference vectors are distributed around an axis in a given predetermined direction.

The absolute value of the average of the phase difference vectors is then compared with a predetermined threshold (step S5). If the absolute value of the average of the phase difference vectors is smaller than the threshold, it is determined that a hard decision error has occurred, and the control signal for the corresponding user is set to "1" (step S6). The flow then returns to the processing in step S1.

If it is determined in step S5 that the average of the phase difference vectors is equal to or more than the threshold, i.e., the decision in the current stage is correct, normal processing must be performed to eliminate the error in the preceding stage. If the decision in the current stage is also wrong, it can be determined which processing is proper. Therefore, the flow returns to the processing in step S3 to set the control signal to "0". Thereafter, the flow returns to the processing in step S1.

After the above processing is performed for all the users, it is checked whether the control signals for all the users are set to "1" (step S7). If there is at least one user for which the control signal is set to "0", the processing is terminated without performing any operation.

If the signals for all the users are set to "1", it indicates that no processing is performed in the current stage, and the result remains the same even in the next stage. For this reason, the control signal for only the user for which the absolute value of the average obtained in step S5 is largest is set to "0" (step S8), and the processing is terminated.

Another Embodiment

In the above embodiment, no consideration is given to a deterioration in decision error estimation precision due to a channel estimation error.

In general, as the number of stages increases, the channel estimation precision improves. The threshold as a determination criterion in step S5 is set to be large in early stages and decreased in the subsequent stages.

This makes it possible to suppress a deterioration in decision error estimation precision due to channel estimation errors, and improve the interference removing characteristics.

What is claimed is:

1. A multi-user parallel interference canceler apparatus for repeatedly performing a hard decision over a plurality of stages to improve channel estimation precision, comprising:
    a plurality of interference estimation units arranged in units of stages, a number of said interference estimation units in each said stage to be equal in number to users, each said interference estimation unit including a hard decision unit;
    a plurality of decision error estimation units arranged in units of stages, each said decision error estimation unit receiving an input from each said hard decision unit in each said interference estimation unit of the corresponding stage;
    a plurality of combiners arranged in units of stages; and
    a plurality of receivers arranged in a last stage in units of users.

2. An apparatus according to claim 1, wherein each of said plurality of receivers comprises a despreading processing unit and a RAKE combiner.

3. A multi-user parallel interference canceler apparatus for repeatedly performing a hard decision over a plurality of stages to improve channel estimation precision, comprising:
    a plurality of interference estimation units arranged in units of stages to be equal in number to users;
    a plurality of decision error estimation units arranged in units of stages;
    a plurality of combiners arranged in units of stages; and
    a plurality of receivers arranged in a last stage in units of users,
    wherein each of said interference estimation units comprises:
        a plurality of despreading processing units each for receiving a received signal or a residual signal in a preceding stage and a symbol replica signal, calculating a reception symbol signal and an estimated value of a transmission path characteristic from the received signal or residual signal and the symbol replica signal, and outputting the reception symbol signal, the estimated value of the transmission path characteristic, and the symbol replica signal from the preceding stage;
        a first combiner (a RAKE combiner) for combining phase-corrected reception symbol signals corresponding to the respective fingers in said plurality of despreading processing units at a maximum ratio;
        a decision unit for making a hard decision about the reception symbol signal combined by said RAKE combiner;
        a plurality of replica generation units for respectively receiving the estimated values of the transmission path characteristics output from said plurality of despreading processing units, the symbol replica signals from the preceding stage, and the hard decision results obtained by said decision units, calculating symbol replica signals and chip replica signals in a current stage from the estimated values of the transmission path characteristics, the symbol replica signals from the preceding stage, and the hard decision results obtained in said decision units, and outputting the symbol replica signals and the chip replica signals;
        a second combiner for combining the chip replica signals output from said plurality of replica generation units;
        a first switch for outputting "0" as the chip replica signal, if the hard decision in the current stage differs from that in the preceding stage and the hard decision in the current stage is wrong, in accordance with a control signal output as a decision result from said decision error estimation units for checking, on the basis of a signal obtained by despreading the received signal or residual signal from the preceding stage which is input to said despreading processing unit, the symbol replica signal input from the preceding stage to said despreading processing unit, and the hard decision result in said decision unit, whether the hard decision in the current stage coincides with that in the preceding stage and the hard decision in the current stage is wrong, and otherwise outputting the chip replica signal generated by said replica generation unit; and
        a second switch for outputting the symbol replica signal in the preceding stage in accordance with the control signal if the hard decision in the current stage differs from that in the preceding stage and the hard decision in the current stage is wrong, and otherwise outputting the symbol replica signal generated by said replica generation unit.

4. An apparatus according to claim 3, wherein said despreading processing unit comprises:
    a despreading unit for despreading the received signal or the residual signal from the preceding stage;
    an adder for adding the signal despread by said despreading unit and the symbol replica signal from the preceding stage and outputting a resultant signal as a reception symbol signal;
    a channel estimation circuit for calculating an estimated value of a transmission path characteristic on the basis of the signal output from said adder; and
    a first multiplier for multiplying the signal output from said adder by the estimated value of the transmission path characteristic calculated by said channel estimation circuit and outputting a resultant signal as a phase-corrected reception symbol signal,
    wherein said replica generation unit comprises:
        a second multiplier for multiplying the hard decision result in said decision unit by the estimated value of the transmission path characteristic output from said despreading processing unit and outputting a resultant signal as a symbol replica signal in the current stage;

a subtracter for subtracting the symbol replica signal in the preceding stage from the symbol replica signal output from said second multiplier; and a re-despreading unit for spreading the signal output from said subtracter and outputting a resultant signal as a chip replica signal in the current stage.

5. An apparatus according to claim 3, wherein said first switch outputs "0" as the chip replica signal in accordance with the control signal if the hard decision result in the current stage differs from that in the previous stage and the hard decision in the current stage is wrong, and otherwise outputs the chip replica signal combined by said second combiner.

6. An apparatus according to claim 4, wherein said second switch outputs the symbol replica signal in the preceding stage in accordance with the control signal if the hard decision in the current stage differs from that in the preceding stage and the hard decision in the current stage is wrong, and otherwise outputs the symbol replica signal output from said second multiplier.

7. An apparatus according to claim 3, wherein said decision error estimation unit calculates a phase difference vector of the reception symbol signal, and decides that the hard decision in the current stage is wrong when an absolute value of an average of the phase difference vectors is smaller than a predetermined threshold.

8. An apparatus according to claim 7, wherein if all decision results in said plurality of interference estimation units indicate that hard decisions are wrong, said decision error estimation unit assumes that there is no error in the hard decision in an interference estimation unit exhibiting a largest absolute value of the average of the phase difference vectors.

9. An apparatus according to claim 3, wherein said decision unit is set such that the threshold gradually decreases toward the last stage.

10. A method of improving channel estimation precision in a multi-user parallel interference canceler apparatus, said method comprising:

in each of a stage comprising a plurality of interference estimation units equal to a number of users, providing a decision error estimation module;

providing into each said decision error estimation module from each interference estimation unit in said stage a despread result, symbol replicas signals, and a hard decision result;

providing said hard decision result to be an output of each said decision error estimation module, said hard decision result output to become an input into a subsequent stage decision error estimation module indicating a hard decision result of a preceding stage;

deciding, in each said decision error estimation module and for each said user, whether an erroneous hard decision has been made; and stopping processing in said stage for any user determined to have a decision error.

11. A multi-user parallel interference canceler apparatus for repeatedly performing a hard decision over a plurality of stages to improve channel estimation precision, said multi-user parallel interference canceler apparatus comprising:

a plurality of interference estimation units arranged in units of stages, a number of said interference estimation units in each said stage to be equal in number to users, each said interference estimation unit receiving as input signals a residual signal and a symbol replica signal and providing as outputs signals a chip replica signal and a symbol replica signal, wherein said chip replica signal output of each said interference estimation unit outputs a first predetermined value if a hard decision in the current stage differs from that in the preceding stage and the hard decision in the current stage is wrong and, otherwise, outputs a value of a chip replica signal generated within said interference estimation unit itself, and said symbol replica signal output of each said interference estimation unit outputs said input symbol replica signal if the hard decision in the current stage differs from that in the preceding stage and the hard decision in the current stage is wrong and, otherwise, outputs a symbol replica signal generated within said interference estimation unit itself.

12. A method of improving channel estimation precision in a multi-user parallel interference canceler apparatus by repeatedly performing a hard decision over a plurality of stages to improve channel estimation precision, said apparatus including a plurality of interference estimation units arranged in units of stages, said method comprising:

outputting, as a chip replica output signal from each said interference estimation unit, a first predetermined value if a hard decision in the current stage differs from that in the preceding stage and the hard decision in the current stage is wrong and, otherwise, a value of a chip replica signal generated within said interference estimation unit itself; and outputting, as a symbol replica output signal from each said interference estimation unit, a symbol replica signal received as an input signal if the hard decision in the current stage differs from that in the preceding stage and the hard decision in the current stage is wrong and, otherwise, a symbol replica signal generated within said interference estimation unit itself.

* * * * *

UNITED STATES PATENT AND TRADEMARK OFFICE
CERTIFICATE OF CORRECTION

PATENT NO.     : 6,553,058 B1
DATED          : April 22, 2003
INVENTOR(S)    : Kosuke Naito It is certified that error appears in the above-identified patent and that said Letters Patent is hereby corrected as shown below:

<u>Title page,</u>
Item [30], should read:
-- [30]  Foreign Application Priority Data
Nov. 9, 1999     (JP) ............................ 11-318483 --

Signed and Sealed this

Twenty-sixth Day of August, 2003

JAMES E. ROGAN
*Director of the United States Patent and Trademark Office*